(No Model.)
C. F. ROPER.
MACHINE FOR SLOTTING SCREW HEADS.
No. 415,472. Patented Nov. 19, 1889.
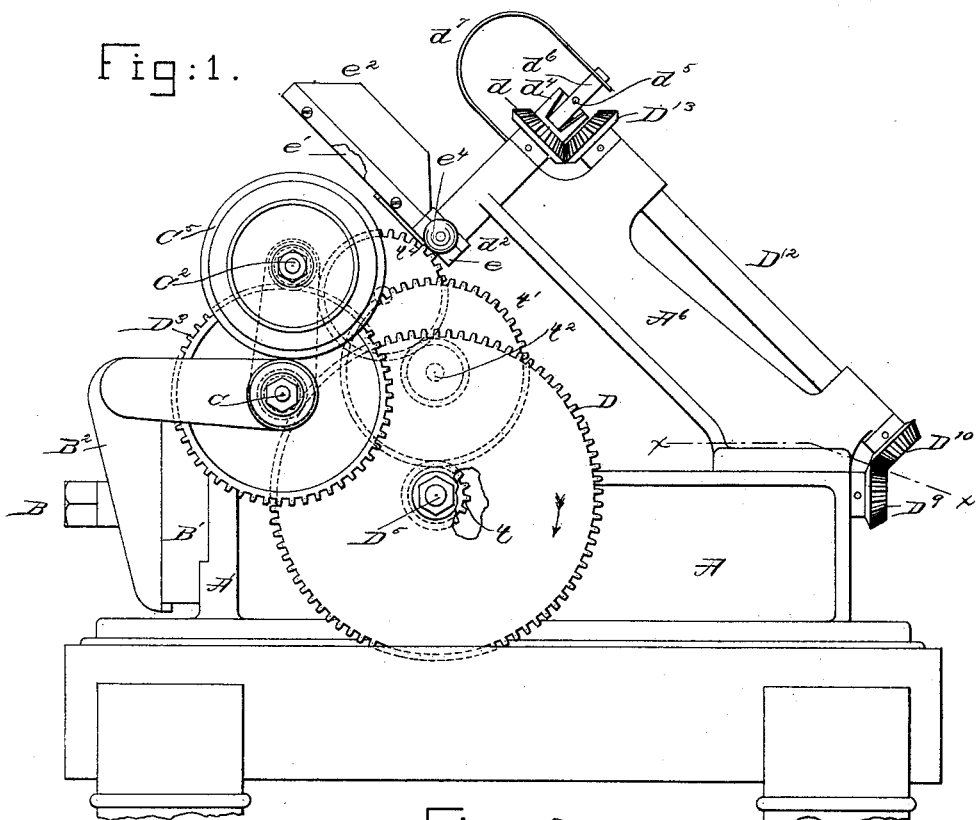
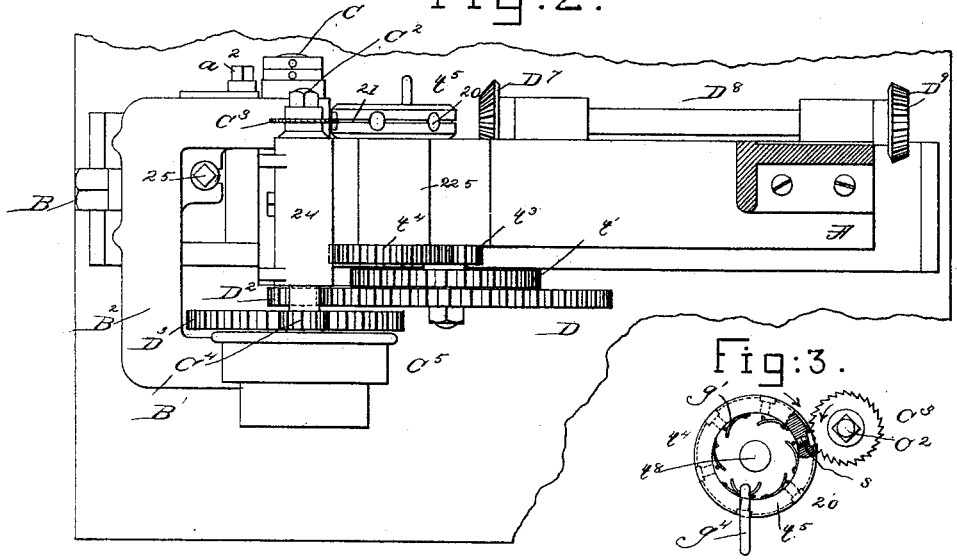
Witnesses.
Arthur Lippstein.
John F. C. Prinkert.
Inventor.
Charles F. Roper.
By Crosby & Gregory attys.

UNITED STATES PATENT OFFICE.

CHARLES F. ROPER, OF HOPEDALE, MASSACHUSETTS, ASSIGNOR TO THE HOPEDALE MACHINE SCREW COMPANY, OF SAME PLACE.

MACHINE FOR SLOTTING SCREW-HEADS.

SPECIFICATION forming part of Letters Patent No. 415,472, dated November 19, 1889.

Application filed May 4, 1885. Serial No. 164,277. (No model.)

*To all whom it may concern:*

Be it known that I, CHARLES F. ROPER, of Hopedale, county of Worcester, and State of Massachusetts, have invented an Improvement in Machines for Slotting Heads of Screws, of which the following description, in connection with the accompanying drawings, is a specification, like letters and figures on the drawings representing like parts.

This invention has for its object the production of a simple and efficient machine by which to automatically slot the heads of screws.

In another application, Serial No. 162,665, filed by me April 18, 1885, I have shown a slotting-machine in which the threaded screws, the heads of which are to be slotted, are automatically presented to an intermittingly-rotating carrier, and while so held the heads of the screws are acted upon and slotted by means of a saw carried by a rocking lever. In this my present invention, intended as an improvement thereon, the screw-carrier is moved or rotated continuously, and the saw-carrying mandrel is held in fixed bearings, and consequently the arbor of the saw always occupies the same position with relation to the axis of the screw-carrier; but to permit this the carrier is so constructed as to leave a space between adjacent screws for the reception of the edge of the saw as it runs out of the head of one screw and approaches the head of another screw.

My invention consists, essentially, in a screw-slotting machine containing a rotating carrier provided with recesses to receive the screws the heads of which are to be slotted, and a rotating saw, the arbor of the saw and the shaft or axis of motion of the rotating carrier being parallel and running in bearings fixed with relation to each other, as will be described.

Other features of invention will be hereinafter described, and fully set forth in the claims at the end of this specification.

Figure 1 is a side elevation of a sufficient portion of a screw-slotting machine to enable my improvements to be understood. Fig. 2 is a top or plan view of Fig. 1, except that part of the same above the dotted line $x$, Fig. 1, and Fig. 3 is a detail showing the screw-carrier and saw, the said carrier being partially broken out, said figure also showing the ejectors and the finger for operating them.

Referring to the drawings, the frame-work A, the standard A', the tongued block B' and bolt B, the block $B^2$, the belt-cone $C^5$, saw-arbor $C^2$, the saw $C^3$, the pinion $C^4$, which engages the gear $D^3$, the pinion $D^2$ at the side of the said gear $D^3$, the gear D, driven by the gear $D^2$, the bevel-gear $D^7$, the shaft $D^8$, the bevel-gears $D^9$ $D^{10}$, the frame-arm $A^6$, the shaft $D^{12}$, the bevel-gears $D^{13}$ and $d$, the elongated hub $d^4$, the screw-ejector $d^6$, the pin $d^5$, the spring $d^7$, the hollow shaft provided with disks $d^2$ at its end, the raceway $e'$, having the hub $e$, and the hopper $e^2$, attached to the raceway, are substantially the same in construction and operation as are like parts designated by like letters in my application referred to.

In this my present invention the block 24, which receives the saw-arbor $C^2$, is fixed with relation to the fulcrum-block $B^2$, instead of, as in the said application, being made movable, so that the said arbor has only a movement of rotation.

The screw-carrier $t^5$ is herein shown as an annulus connected with the shaft $t^8$, held in the bearings 225, the said shaft at its opposite end having a toothed gear $t^4$, which is engaged by the pinion $t^3$ on the stud $t^2$, the said pinion and stud being shown in dotted lines, Fig. 1. The pinion $t^3$ is fast at one side to a toothed gear $t'$, running loosely on the stud $t^2$, and the said gear $t'$ is engaged and driven by a gear $t$, fast to the interior of the toothed gear D, the latter being mounted loosely on the stud $D^5$. The shaft $t^8$ of the screw-carrier $t^5$ is rotated continuously by the gearing described, and the shaft $t^8$ is rotated in its fixed bearing or remains at the same relative distance from the saw-arbor $C^2$.

The screw-carrier $t^5$ has a series of recesses 20 for the reception of the screws $s$, the heads of which are to be slotted, and between the said recesses the periphery of the carrier is cut away or removed, as at 21, to form a channel or groove in which the teeth of the saw may run while the carrier is being rotated, the said groove 21 intersecting those portions of the recesses 20 which receive the heads of the screws to be slotted.

The carrier herein shown has its recesses so shaped and formed as to receive not only the shanks but the heads of the screws which are to be slotted, and as the faces of the heads are substantially flush with the periphery of the carrier, and as the saw has only a movement of rotation, and as the carrier is also rotated, it is obvious, were it not for the groove 21, that the saw would cut into the periphery of the carrier as the latter in its rotation brings the screws $s$ successively into position to be slotted by the saw.

In accordance with this present invention the shaft $t^8$ of the carrier, and the arbor $C^2$ of the saw, are rotated in opposite directions, (see Fig. 3,) so that the saw, when it strikes the head of the screw, tends to force the blank more closely into the recess of the carrier.

The carrier has a series of ejectors $g'$—one for each recess 20—and the said ejectors, made as springs with projections, are operated to cause the projections to act against and remove the screws from the carrier by means of a cam supported by the finger $g^4$. The said finger and ejectors $g'$ are the same as in my application referred to, where they are designated by like letters.

The threaded blanks, the heads of which are to be slotted, are placed in the hopper $e^2$, which is rotated, and, by the ejector $d^6$ and the cut-off slide $e^4$, which, co-operating at the proper time, as in my said application, the threaded screws are placed one at a time in the recesses 20 as the latter are brought opposite the said ejector $d^6$. The speed of rotation of the carrier and the shape of the cam-surface of the hub $d^4$ and the strength of the spring $d^7$ are such as to enable the threaded screw to be placed in the recess 20 while the carrier is in motion.

The parts hereinabove referred to as common to the application, Serial No. 162,665, are not herein claimed, as they are made subject of claim in the said application.

I claim—

1. In a screw-slotting machine, a rotating carrier provided with recesses to receive snugly the screws the heads of which are to be slotted, combined with a rotating saw, the arbor of the saw and the shaft or axis of motion of the rotating carrier being parallel and running in bearings fixed with relation to each other, the saw and carrier being rotated in opposite directions to force the screws more closely into the said recesses, substantially as described.

2. In a screw-slotting machine, a rotating annular carrier recessed at its periphery to receive both the shanks and the heads of the screws to be slotted, the head-forming recesses being slotted transversely to permit the rotating saw to enter at one side of the head-receiving recess and leave it at the other side thereof, combined with a rotating saw and arbor, upon which the said saw is fastened, and fixed bearings for the shaft or arbor of the said carrier and the said saw, and with ejectors upon the inner circumference of said annular carrier to remove the screws therefrom, substantially as described.

3. In a screw-slotting machine, a rotating carrier provided with recesses to receive the screws the heads of which are to be slotted, and ejectors co-operating with the said carrier to remove the screws from it, combined with a rotating saw, its arbor, and fixed bearings therefor, the arbor for the saw and the shaft to which the carrier is attached being parallel, to operate substantially as described.

In testimony whereof I have signed my name to this specification in the presence of two subscribing witnesses.

CHARLES F. ROPER.

Witnesses:
F. J. DUTCHER,
WM. J. WOODS.